Oct. 14, 1958  J. BIDAK ET AL  2,856,163
REFRIGERATOR CONDENSER
Filed April 15, 1954
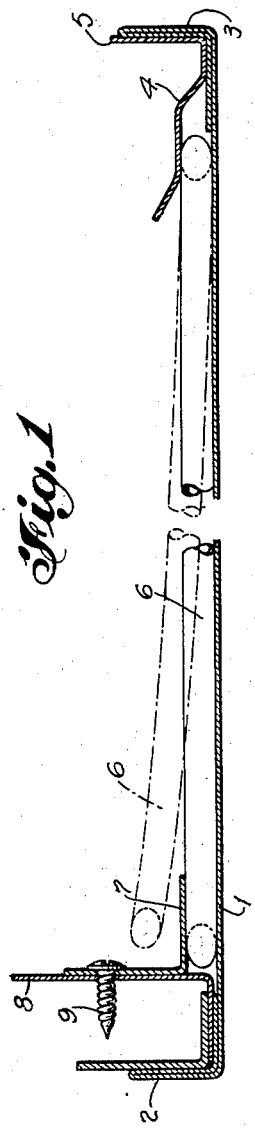
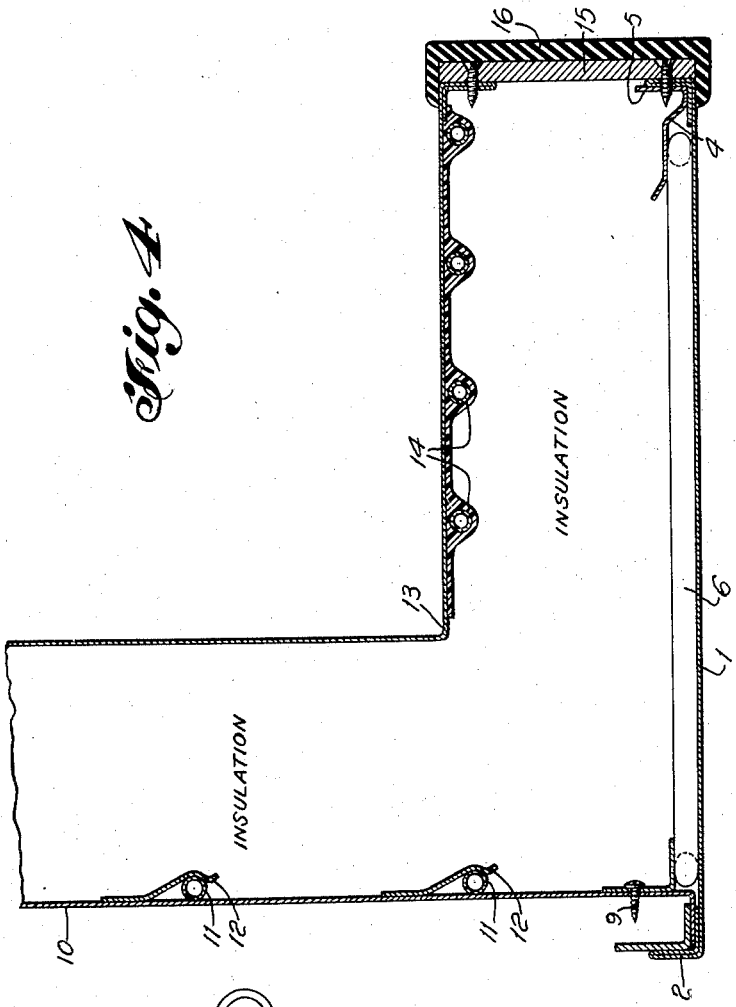
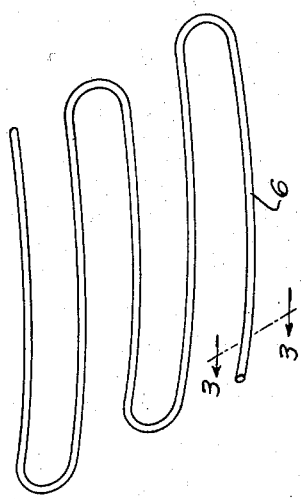
INVENTORS
J. BIDAK
H. E. BRIESEMEISTER
BY
ATTORNEY United States Patent Office 2,856,163
Patented Oct. 14, 1958

2,856,163

REFRIGERATOR CONDENSER

John Bidak and Harold Ernest Briesemeister, Duluth, Minn., assignors, by mesne assignments, to Illinois McGraw Electric Company, Macomb, Ill., a corporation of Illinois Application April 15, 1954, Serial No. 423,447

5 Claims. (Cl. 257—256)

This invention relates to refrigerators and more particularly to the mounting of refrigerant conveying assemblies.

In recent years many freezers are constructed with the condenser tubing on outer cabinet walls to reduce the likelihood of condensation on their outer surfaces during periods of high humidity. By arranging these condenser coils on the inner surface of the outer wall in good heat transfer relationship sufficient heat is obtained from the coolant to maintain the cabinet wall at a temperature equal to or higher than the surrounding air temperature so that the condensation problem is avoided.

In refrigerator cabinet construction in common use at the present time the high side tubing, that is the condenser tubing, is secured to the surface of the wall by spot welding numerous clamps thereto. The tubing is then covered with some material to improve its heat transfer. For example, a material known as "hydrolene" is used for this purpose. This method of attaching a tubing assembly is slow and costly requiring excessive amount of man power time to do it properly. However, it is necessary to secure good heat transfer and, therefore, this procedure has been followed in the past. In addition to the excessive time required in securing the tubing in this manner the outer surface of the metal may be roughened due to the spot welding and, therefore, additional time is required to smooth down the outer surface to minimize the unsightly appearance of the spot welding showing through the paint or enamel. In addition the use of the "hydrolene" or similar material is relatively time-consuming and because of its nature may also result in smudges on the exterior of the wall which have to be removed.

It is an object of this invention to provide a tubing assembly and clamps therefor which avoids the difficulties encountered in the prior art constructions.

In accordance with this invention there is provided an arrangement for maintaining a tubing assembly in heat transfer contact with a wall wherein a tubing assembly is normally shaped throughout its length, for example, arcuately curved, so that in released condition it will contact the wall in only one line transverse to the length of the assembly, and clamping means are provided at the ends of the assembly to hold the tubing ends against the walls so that throughout its length the tubing assembly will exert a pressure contact between itself and the wall. Preferably the tubing assembly is also slightly flattened so as to provide a larger surface contact with the wall and the clamps are arranged on wall portions or on wall sections at right angles to the principal wall so that any welding or fastening means will not be present on the exposed side wall to which the tubing is affixed.

The above-mentioned and other features and objects of this invention and the manner of attaining them will become more apparent and the invention itself will be best understood by reference to the following description of an embodiment of the invention taken in conjunction with the accompanying drawings, in which:

Fig. 1 is a sectional view of a portion of a freezer cabinet wall illustrating a tubing assembly and clamping means in accordance with this invention;

Fig. 2 is a perspective view of a typical tubing assembly to be mounted on the refrigerator wall;

Fig. 3 is a cross-sectional view taken along the line 3—3 of Fig. 2, and

Fig. 4 is a fragmentary cross sectional view of the portion of a freezer illustrating the tubing assembly in accordance with this invention.

Turning first to Fig. 1, there is shown a portion of an outer wall 1 of a freezer cabinet, one end of this portion being folded over as shown at 2, the other end being bent at right angles as shown at 3; the portion 2 representing the rear or bottom end of the freezer cabinet and 3 the front or upper end of such cabinet. A relatively stiff resilient steel retaining clamp 4 may be spot welded to 3 as indicated at 5. This strip may extend the full length of this side wall 1 and may be extended about any other walls to which tubing is to be fastened. The spot weld points 5 are made only on the portion then of the freezer which will be covered by the breaker strip or molding and, therefore, do not present the problem which would occur with spot welding on the exterior surface of wall 1. The design of retainer clamp 4 is such that it serves to position the tubing assembly when inserted thereunder so that special locking jigs are not required. Likewise, the resilient clamp tends to hold the entire assembly in position during the remaining steps.

At the other end the tubing assembly may be held in position by an angle iron 7 which is forced against the other end of the tubing holding it in place. Angle iron 7 may be fastened to the rear wall 8 and the cabinet by metal retaining screws 9 or other means. Wall 8 in turn may be fastened to portion 2 of wall 1 and since this is an unexposed part of the cabinet will not present any finishing difficulties.

In order to secure good contact throughout the length of the tubing assembly, the tubing is preferably first shaped in a serpentine form with several transverse runs as shown in Fig. 2, and then is subjected to pressure producing a substantially uniform curved contour to each of the runs of the assembly. At the same time, the pressure used to provide this curvature may somewhat flatten the tubing into an oval shape as shown in Fig. 3. Reverting to Fig. 1, it will be seen that because of the curvature of the assembly 6, as shown in dotted lines in this figure, prior to the complete clamping into position the tubing will be forced under strain against the inner surface of wall 1. Thus good heat transfer contact is secured between the tubing assembly 6 and wall 1 without the necessity of providing "hydrolene" or other thermo conductive material.

It will be clear that the tubing material is made of metal having sufficient resilience to tend to retain its resilient or unstrained condition so that the pressure will be a continuing one. It will also be evident that if for any reason it is necessary to remove the tubing this can be done readily without the necessity of melting out welded joints which might destroy the cabinet.

Turning now to Fig. 4, there is illustrated a portion of a freezer incorporating a tubing assembly 6 in accordance with the features of this invention. This may be considered as representing a section through a chest-type freezer. The assembly of condenser tubing on the outer wall 1 is shown substantially similar to that as shown in Fig. 1. The bottom outer wall of the freezer is shown at 10 and condenser pipes 11 are fastened thereto by means of the conventional welded clamps as shown at 12, The interior wall of the cabinet is shown at 13 and the refrigerant tubing is shown at 14 in contact with the inner surface of walls 13 and covered with a thermo transfer material so that good heat transfer is assured at this point. While the assembly similar to that shown at 6 might be used also for the inner cooling coils, it is considered that instead of higher heat transfer efficiencies the older conventional system may be preferable here.

It will be seen that the weld junctions 5 are covered by breaker strip 15 which is in turn covered by the throat molding 16 to which the door or lid fits.

While we have described above the principles of our invention in connection with specific apparatus, it is to be clearly understood that this description is made only by way of example and not as a limitation to the scope of our invention as set forth in the objects of our invention and in the objects thereof and in the accompanying claims.

What is claimed is:

1. In combination a resiliently flexible tubing assembly, a wall on which said tubing assembly is to be mounted, holding means for holding said assembly against said wall, said tubing assembly including generally-parallel tube runs traversing said wall, each of a plurality of said runs, when not stressed by said holding means, having a shape for rocking from end to end of said run on said wall, said holding means holding both ends of each one of said plurality of runs, for thereby flexing said plurality of runs and holding substantially the entire length of each one in resilient pressure contact with said wall.

2. The combination of claim 1 wherein said means comprises clamps fastened to said wall.

3. The combination of claim 1 wherein said wall is substantially planar.

4. The combination of claim 3 wherein a section of said face of said tubing assembly is substantially an arc of a circle.

5. In combination, an approximately planar wall, a resiliently flexible tubing assembly having a face normally convex with respect to said wall, and clamping means for holding the extremities of said tubing assembly against said wall for flexing the whole convex face of said assembly into contact with said wall, whereby the resilience of said assembly maintains said contact under pressure substantially throughout said face.

References Cited in the file of this patent

UNITED STATES PATENTS

| | | |
|---|---|---|
| 2,517,212 | Kafer et al. | Aug. 1, 1950 |
| 2,517,411 | Patterson | Aug. 1, 1950 |
| 2,654,231 | Eichorn | Oct. 6, 1953 |

FOREIGN PATENTS

| | | |
|---|---|---|
| 113,395 | Australia | July 17, 1941 |